Figure 1:
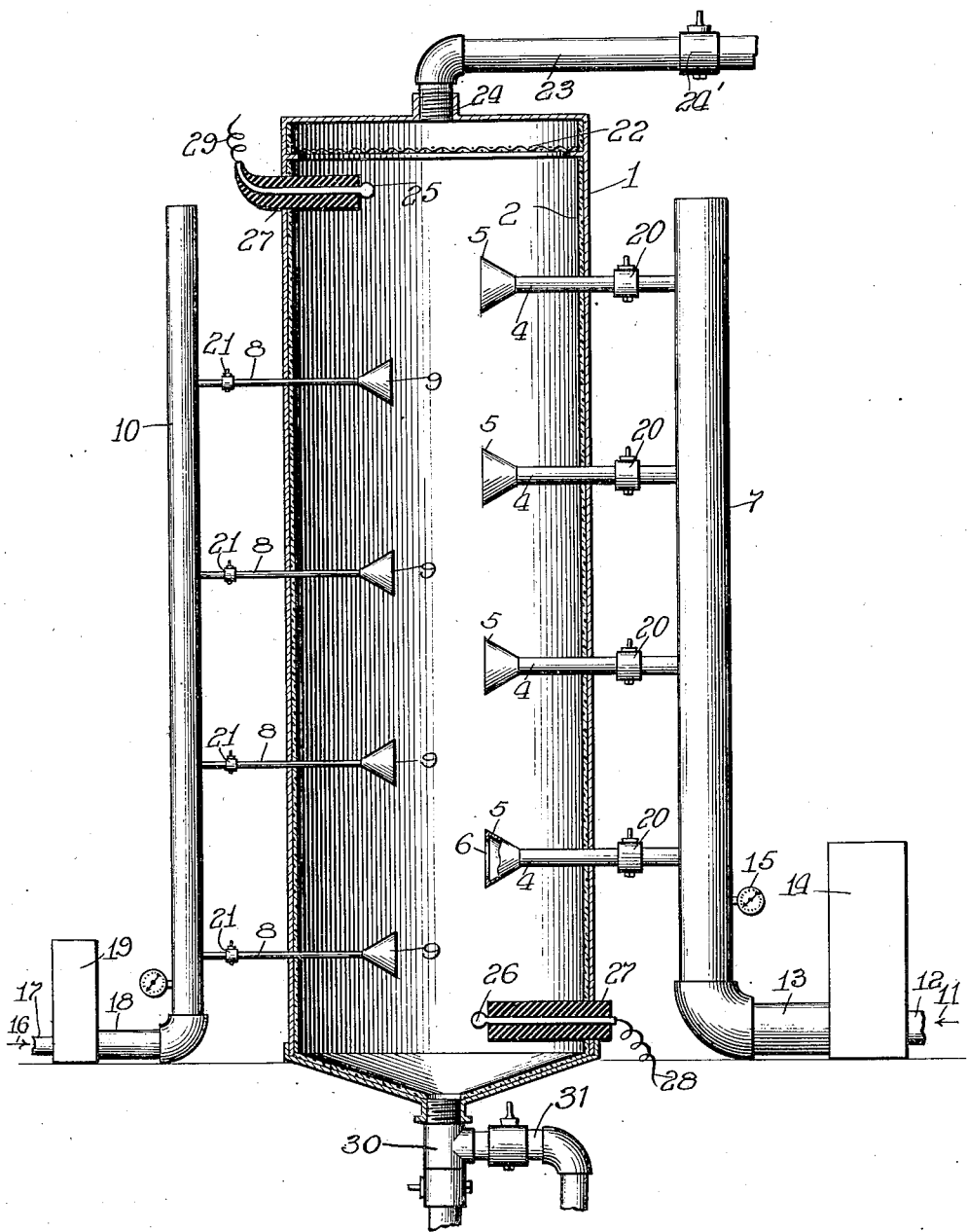

O. P. HURFORD.
PROCESS OF MAKING SALTS OF AMMONIA, ESPECIALLY SULFATE OF AMMONIA.
APPLICATION FILED DEC. 12, 1908.

940,972.

Patented Nov. 23, 1909.
2 SHEETS—SHEET 1.

Witnesses
R. A. White,
H. R. L. White

Inventor
Oliver P. Hurford.
By Brown & Williams
Attys

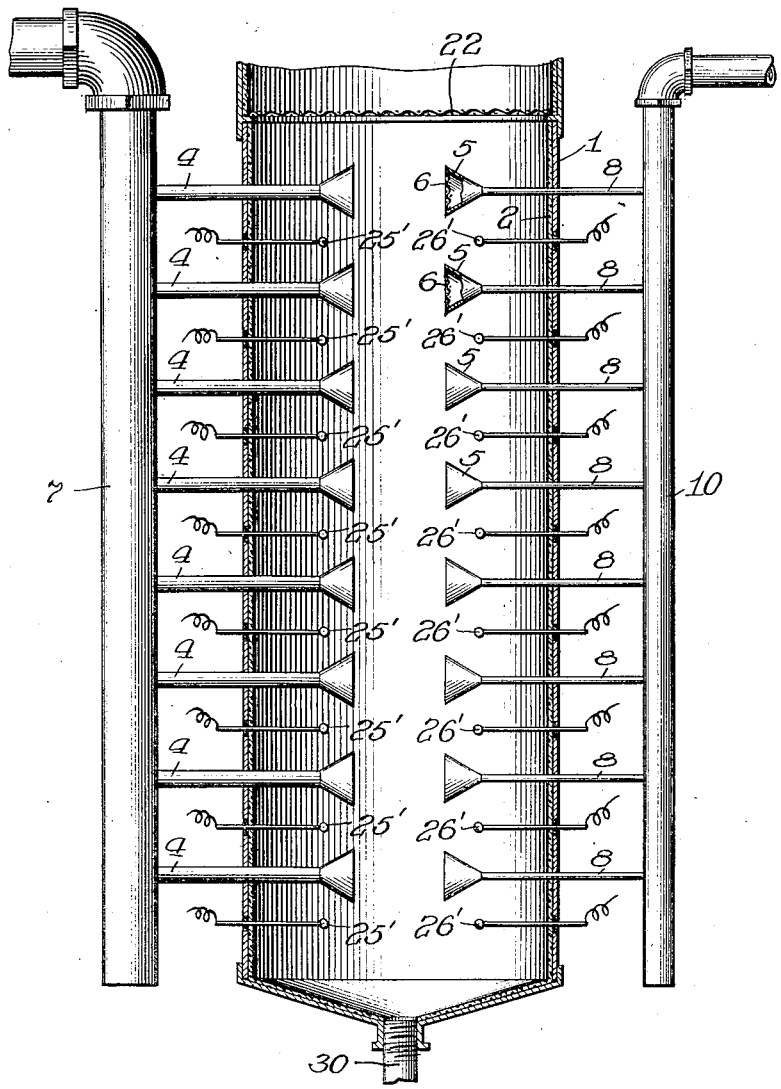

UNITED STATES PATENT OFFICE.

OLIVER P. HURFORD, OF CHICAGO, ILLINOIS.

PROCESS OF MAKING SALTS OF AMMONIA, ESPECIALLY SULFATE OF AMMONIA.

940,972. Specification of Letters Patent. Patented Nov. 23, 1909.

Application filed December 12, 1908. Serial No. 467,125.

*To all whom it may concern:*

Be it known that I, OLIVER P. HURFORD, a citizen of the United States, residing at Chicago, in the county of Cook and State of Illinois, have invented a certain new and useful Improvement in Processes of Making Salts of Ammonia, Especially Sulfate of Ammonia, (Case 1,) of which the following is a full, clear, concise, and exact description, reference being had to the accompanying drawings, forming a part of this specification.

My invention relates to a method and apparatus for the manufacture of ammonia compounds, particularly sulfate of ammonia.

My method, broadly speaking, consists in causing the chemical union of nitrogen gas and hydrogen gas under the influence of electrical discharges, in the presence of a suitable acid which combines with the ammonia as fast as it is formed to hold the same by forming a compound of ammonia. Without the presence of a third element to hold or "fix" the ammonia gas, the latter would be disassociated into its constituent elements of hydrogen and nitrogen by the further action of the electric sparks or discharges. The percentage of ammonia formed in this way depends upon the length of the electric spark, but it may be stated that usually from two to six per cent. will be formed. The disassociation of the ammonia into its constituent elements is to the extent of about eighty-six per cent of the ammonia actually formed. It is the object of my invention to prevent this disassociation.

This method is particularly applicable to the manufacture of ammonium sulfate which, as well known, is one of the best of fertilizers. In producing this compound, I cause the nitrogen and hydrogen gases to unite under the influence of electric discharges in the presence of sulfuric acid which is introduced into the receptacle in the form of a spray or vapor, whereby the sulfuric acid and ammonia at once combine to form ammonium sulfate, which is then withdrawn from the receptacle.

I have also devised a form of apparatus which is well adapted for the carrying out of my process, although various other forms of apparatus might be devised for the same purpose. The essence of my invention as related to the process is in no way dependent upon the particular form of apparatus employed.

Before explaining the details of my process, I shall describe the form of apparatus which I have shown in the accompanying drawings, where—

Figure 1 is a detail cross-sectional view of a form of apparatus which I have devised, in this connection, certain of the parts being, for the sake of clearness, shown in full; and Fig. 2, is a detail cross-sectional view of a slightly modified form of apparatus.

The cylindrical receptacle 1 is lined upon the interior thereof with a suitable insulating material 2. Projecting into this receptacle is a series of pipes or tubes 4 preferably of insulating material, as for instance, glass. The inner ends of these tubes may be provided with slotted enlargements 5 in the shape of flattened funnels. The slots or openings are indicated at 6. The tubes 4 are at their outer ends connected to the stand-pipe 7, with which they are in communication. Extending into the receptacle from the opposite side is a series of tubes 8 also preferably of insulating material, and provided at their inner ends with slotted enlargements 8, having ends in the shape of flattened funnels 9, similar to the enlargements on the tubes 4. At their outer ends, the tubes 8 are connected with the stand pipe 10, with which they are in communication. The stand pipe 7, which is closed at the top, is at its other end in communication with a source of hydrogen gas supply, as indicated diagrammatically by the arrow 11. Between pipe 12, leading from the gas supply, and pipe 13 is a blower-arrangement indicated diagrammatically at 14. The object of this blower-arrangement is to maintain the pressure of the gas practically constant as it is forced through the stand pipe 7. A gage 15 may be used to indicate the pressure in the pipe. The stand pipe 10, which is closed at the top, is at its other end in communication with a source of nitrogen gas supply, as indicated diagrammatically by the arrow 16. Between the pipe 17, leading from the source of nitrogen supply, and pipe 18, there is a blower-arrangement indicated diagrammatically at 19, similar to the blower-arrangement used in connection with the other stand pipe 7. The object of the blower arrangement 19 is to maintain the pressure of the gas in the stand pipe 10, practically constant. By regulating the speed of the blowers in 14 and 19, the gases may be kept at the same pressures in the respective stand pipes, so that they will be discharged into the receptacle at the same pressure. If desirable, valves 20 and 21 may be used in connection with the tubes 4 and 8 respectively, for the purpose of regulating the supply of gas, or shutting the same off.

In the upper portion of the receptacle is arranged a perforated partition or screen 22. A pipe 23 communicates with the top of the receptacle at 24, for the purpose of introducing a suitable acid into the receptacle. As it comes into contact with the perforated partition 22, the acid is, as it were, broken up into a fine spray, in which form it passes through the receptacle. A valve 24' may be used to regulate the supply of the acid.

In the upper portion of the receptacle is arranged the electrode 25 adapted to be connected to one side of a suitable source of electrical energy. In the lower portion of the receptacle is arranged the opposite electrode 26 connected to the opposite side of the source of electrical energy. These electrodes are of course thoroughly insulated from any metallic parts of the apparatus, as indicated by the insulating sleeves 27. I have not deemed it desirable to show the complete electrical circuit of these electrodes, for the reason that it lies within the skill of any electrician to connect these electrodes properly in the desired circuit. I have merely indicated by the wires 28 and 29 that the electrodes are to be connected in a suitable electrical circuit, calculated to cause the passage of sparks between the electrodes 25 and 26 in the receptacle. The amount of voltage necessary to produce such sparking is purely a matter of mathematical calculation, depending, among other things, upon the distance between the electrodes used. For instance, in certain cases 50,000 volts might be sufficient to produce the necessary discharges, while in other instances a higher voltage might be necessary.

With this description of a form of apparatus adapted to carry out my process, I shall now describe the various steps of my process: The nitrogen gas is introduced into the receptacle through tubes 8, while the hydrogen gas is introduced through the oppositely situated pipes 4. It will be noticed that in Fig. 1 the pipes 4 and 8 are arranged in staggering relation while in the modification shown in Fig. 2, they are arranged in alinement. The precise arrangement of the supply tubes is more or less of a mechanical detail depending upon the precise arrangement of the electrodes. With the electrodes arranged as in Fig. 1, a wider path is provided for the electric discharges by arranging the supply tubes in a staggering relation. In Fig. 2 the electrodes 25' and 26' are substantially in alinement, each pair of electrodes being arranged between a pair of supply pipes. Of course, the number of pairs of electrodes as well as the number of supply pipes may be varied according to circumstances. As electrical discharges take place with the nitrogen and hydrogen gases streaming into the receptacle, the following chemical reaction takes place:

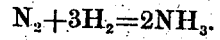

This, interpreted, means that one volume of nitrogen gas combines with three volumes of hydrogen gas to form two volumes of ammonia gas. On account of this proportion, in which the gases unite, the stand pipe 7 through which the hydrogen passes has a volume approximately three times that of the stand pipe 10, through which the nitrogen passes. The supply tubes 4 have a cross-sectional area approximately three times that of the supply tubes 8. The result of this arrangement is that approximately three times as much hydrogen is introduced into the receptacle as nitrogen. Although it is not, of course, absolutely necessary that the gases be introduced into the receptacle, they will combine in no other proportion than that above indicated, that is to say, in the proportion of three volumes of hydrogen to one volume of nitrogen. However, unless some third element be introduced into the receptacle to hold or "fix" the ammonia gas, the latter will, under the influence of the continued electric discharges, be disassociated into the elements nitrogen and hydrogen. For this reason, I introduce a suitable acid through the pipe 23, the particular kind of acid used depending upon the particular ammonium product which it is desired to obtain. In the manufacture of sulfate of ammonia, sulfuric acid is introduced. If some other acid, for instance, hydrochloric acid be used, the resulting product would be ammonium chlorid. Assuming that it is desired to make ammonia sulfate, sulfuric acid is introduced through the pipe 23, and as it falls upon the screen or perforated partition 22, it will be scattered, as it were, and pass through the screen into the receptacle in the form of a fine spray or vapor. The spray or vapor of sulfuric acid coming into contact with the ammonia gas, at the very instant of its formation, results in the following chemical reaction:

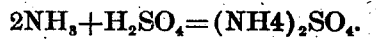

That is to say, the ammonia gas combines with the sulfuric acid to form ammonium sulfate, or sulfate of ammonia as it is also called. This liquid is led out of the receptacle through the discharge pipe 30 at the bottom of the receptacle. In case it is found that the ammonia sulfate contains an excess of sulfuric acid, it may be subjected to treatment for the neutralization of the sulfuric acid by some alkali. If it is desired to thus subject the ammonium sulfate to this further treatment, it may be led out of the receptacle through the auxiliary discharge pipe 31.

From the above description of my process, it will be seen that the underlying idea is the chemical union of nitrogen gas and hydrogen gas, under the influence of electric discharges in the presence of an acid which will hold the ammonia gas by combining with it to form an ammonium compound. The various attendant details in the carrying out of the process may be varied and naturally would be varied, under varying circumstances. For this reason, I have not attempted nor found it necessary to specify dimensions of the apparatus, or the particular manner in which the electrodes should be arranged in the receptacle. Nor have I found it necessary to describe the kind of electrical energy with which the discharge electrodes are connected or any of the circuit arrangements. These, as above stated, are details that are well understood by those skilled in the electrical art.

Having thus described my invention, what I claim as new and desire to secure by Letters Patent of the United States is:—

1. The process of producing sulfate of ammonia which consists in causing nitrogen gas and hydrogen gas to unite under the influence of electric discharges to form ammonia gas, and subjecting the ammonia gas as fast as it is formed to the action of sulfuric acid, whereby sulfate of ammonia is formed.

2. The process of producing sulfate of ammonia which consists in leading nitrogen gas and hydrogen gas into a closed receptacle, causing the mixed gases to unite in said receptacle under the influence of electric discharges to form ammonia gas, simultaneously introducing sulfuric acid into the receptacle, whereby the ammonia gas combines with the sulfuric acid to form sulfate of ammonia, and withdrawing the sulfate of ammonia thus formed.

3. The process of producing sulfate of ammonia which consists in causing nitrogen gas and hydrogen gas to unite under the influence of electric discharges to form ammonia gas in the presence of sulfuric acid which combines with the ammonia gas to form sulfate of ammonia.

4. The process of producing sulfate of ammonia which consists in causing nitrogen gas and hydrogen gas to unite under the influence of electric discharges to form ammonia gas, while causing a spray of sulfuric acid to pass through the receptacle, whereby the ammonia gas combines with the sulfuric acid to form sulfate of ammonia, and withdrawing the sulfate of ammonia from the receptacle.

5. The process of producing sulfate of ammonia, which consists in leading nitrogen gas and hydrogen gas separately into a closed receptacle, approximately in the proportion of one volume of nitrogen to three volumes of hydrogen, causing the mixed gases to unite under the influence of electric discharges to form ammonia gas, while causing a spray of sulfuric acid to pass through the receptacle, whereby the ammonia gas combines with the sulfuric acid to form sulfate of ammonia and withdrawing the sulfate of ammonia from the receptacle.

6. The process of producing salts of ammonia which consists in causing nitrogen gas and hydrogen gas to unite under the influence of electric discharges to form ammonia gas in the presence of an acid which combines with the ammonia gas to form a salt of ammonia.

7. The process of producing sulfate of ammonia which consists in leading hydrogen gas and nitrogen gas separately into a receptacle where they become mixed, causing the mixed gases to unite in the receptacle under the influence of electric discharges to form ammonia gas, and subjecting the ammonia gas as fast as it is formed to the action of sulfuric acid to combine with the ammonia gas to form sulfate of ammonia.

8. The process of producing sulfate of ammonia which consists in leading hydrogen gas and nitrogen gas separately into a receptacle from opposite sides thereof whereby the gases become mixed, causing the mixed gases to unite in the receptacle under the influence of electric discharges to form ammonia gas, and subjecting the ammonia gas as fast as it is formed to the action of sulfuric acid to combine with the ammonia gas to form sulfate of ammonia.

9. The process of producing sulfate of ammonia which consists in leading hydrogen gas and nitrogen gas into a receptacle, causing the mixed gases to unite in the receptacle under the influence of electric discharges to form ammonia gas, in the presence of a descending spray of sulfuric acid, which combines with the ammonia gas as fast as it is formed and carries it in the form of sulfate of ammonia to the bottom of the receptacle, and withdrawing the sulfate of ammonia thus formed.

10. In an apparatus of the kind described, the combination of a closed receptacle, a series of tubes extending into said receptacle from opposite sides thereof and arranged to be connected with a source of gas supply, said tubes having openings for introducing gases into the receptacle, electrodes extending into the receptacle and adapted to be connected to a suitable source of current supply to produce discharges between said electrodes, whereby the gases in the receptacle are caused to unite to form a compound, means for introducing a suitable substance into the receptacle during the discharges to act upon the compound formed, and means for withdrawing the product.

11. In an apparatus of the kind described, the combination of a closed receptacle, a pair of pipes associated therewith and connected each with a source of gas supply, a series of tubes extending from said pipes into the receptacle, said tubes being at their inner ends provided with openings for introducing the gases into the receptacle, electrodes extending into the receptacle and adapted to be connected to a suitable source of current supply to produce discharges between said electrodes, whereby the gases in the receptacle are caused to unite to form a compound, means for introducing a spray of acid into the receptacle during the discharges to act upon the compound formed, and means for withdrawing the product.

12. In an apparatus of the kind described, the combination of a closed receptacle having an insulating lining upon the interior thereof, a pair of pipes associated therewith and connected each with a source of gas supply, a series of tubes of insulating material extending from said pipes into the receptacle, said tubes being at their inner ends provided with enlargements having openings for introducing the gases into the receptacle, electrodes extending into the receptacle and adapted to be connected to a suitable source of current supply to produce discharges between said electrodes, whereby the gases in the receptacle are caused to unite to form a compound, a perforated partition in the upper part of the receptacle for introducing a spray of acid into the receptacle during the discharges to act upon the compound formed, and means for withdrawing the product.

In witness whereof, I hereunto subscribe my name this 9th day of December A. D. 1908.

OLIVER P. HURFORD.

Witnesses:
LEONARD W. NOVANDER,
A. A. THOMAS.